US010030208B2

(12) United States Patent
Zia et al.

(10) Patent No.: US 10,030,208 B2
(45) Date of Patent: Jul. 24, 2018

(54) INTRINSIC LOW FRICTION POLYOXYMETHYLENE

(71) Applicant: Ticona GmbH, Sulzbach, Taunus (DE)

(72) Inventors: Qamer Zia, Frankfurt (DE); Oliver Juenger, Mainz (DE); Jos Bastiaens, Sulzbach (DE); Kirsten Markgraf, Weinheim (DE)

(73) Assignee: Celanese Sales Germany GmbH, Sulzback (Taunus) (DE)

( * ) Notice: Subject to any disclaimer, the term of this patent is extended or adjusted under 35 U.S.C. 154(b) by 0 days.

(21) Appl. No.: 14/511,891

(22) Filed: Oct. 10, 2014

(65) Prior Publication Data

US 2015/0111796 A1    Apr. 23, 2015

Related U.S. Application Data

(60) Provisional application No. 61/893,474, filed on Oct. 21, 2013.

(51) Int. Cl.

| | |
|---|---|
| *C10M 155/02* | (2006.01) |
| *C10M 125/26* | (2006.01) |
| *C08L 59/04* | (2006.01) |
| *C08L 61/00* | (2006.01) |
| *C08G 16/02* | (2006.01) |
| *C08L 59/00* | (2006.01) |
| *C08K 3/38* | (2006.01) |

(52) U.S. Cl.
CPC ........... *C10M 155/02* (2013.01); *C08L 59/04* (2013.01); *C10M 125/26* (2013.01); *C08G 16/02* (2013.01); *C08K 2003/385* (2013.01); *C08L 59/00* (2013.01); *C08L 61/00* (2013.01); *C10M 2229/02* (2013.01)

(58) Field of Classification Search
USPC ................................................ 508/100–109
See application file for complete search history.

(56) References Cited

U.S. PATENT DOCUMENTS

| | | | |
|---|---|---|---|
| 3,629,310 A | 12/1971 | Bailey et al. | |
| 4,111,887 A | 9/1978 | Shaner et al. | |
| 4,394,468 A | 7/1983 | Lu | |
| 4,480,071 A * | 10/1984 | Natarajan | C08G 18/165 524/593 |
| 4,645,785 A | 2/1987 | Heinz et al. | |
| 4,874,807 A | 10/1989 | Endo et al. | |
| 4,879,331 A | 11/1989 | Endo et al. | |
| 4,959,404 A | 9/1990 | Nakane et al. | |
| 5,063,263 A | 11/1991 | Hayes et al. | |
| 5,177,123 A | 1/1993 | Takayama et al. | |
| 5,237,008 A | 8/1993 | Kosinski | |
| 5,264,516 A | 11/1993 | Hijikata et al. | |
| 5,310,822 A | 5/1994 | Kielhorn-Bayer et al. | |
| 5,314,912 A | 5/1994 | Yoshitani et al. | |
| 5,346,737 A | 9/1994 | Takahashi et al. | |
| 5,374,485 A | 12/1994 | Wakatsuka et al. | |
| 5,415,791 A | 5/1995 | Chou et al. | |
| 5,482,987 A | 1/1996 | Forschirm | |
| 5,530,061 A | 6/1996 | Sanada et al. | |
| 5,538,793 A | 7/1996 | Inokuchi et al. | |
| 5,559,180 A | 9/1996 | Takahashi et al. | |
| 5,641,824 A | 6/1997 | Forschirm | |
| 5,824,742 A | 10/1998 | Shinohara | |
| 5,852,135 A | 12/1998 | Kanai et al. | |
| 5,854,324 A | 12/1998 | Tajima et al. | |
| 5,886,066 A | 3/1999 | Forschirm | |
| 5,889,102 A | 3/1999 | Haack et al. | |
| 6,046,141 A | 4/2000 | Kurz et al. | |
| 6,130,280 A | 10/2000 | Yokoyama et al. | |
| 6,161,685 A | 12/2000 | Stebnicki | |
| 6,191,222 B1 | 2/2001 | Keller et al. | |
| 6,207,769 B1 | 3/2001 | Gerlach et al. | |
| 6,284,828 B1 | 9/2001 | Takayama | |
| 6,489,388 B1 * | 12/2002 | Kurz | C08L 59/00 524/432 |
| 6,602,953 B1 | 8/2003 | Horio et al. | |
| 6,790,385 B2 | 9/2004 | Schleith et al. | |

(Continued)

FOREIGN PATENT DOCUMENTS

| | | |
|---|---|---|
| CN | 101343396 | 1/2009 |
| CN | 101759955 | 6/2010 |

(Continued)

OTHER PUBLICATIONS

Dow Corning® Si Powder Resin Modifiers, Product Information Sheet.
International Search Report and Written Opinion PCT/IB2014/065222, dated Mar. 4, 2015, 10 pages.
International Search Report and Written Opinion for PCT/IB2014/065223 dated Jan. 20, 2015, 7 pages.
International Preliminary Report on Patentability for PCT/IB2014/065222 dated Apr. 26, 2016, 7 pages.
International Preliminary Report on Patentability for PCT/IB2014/065223 dated May 6, 2016, 5 pages.
Third Party Observations for PCT/IB2014/065222 dated Feb. 18, 2016, 5 pages.
Laursen J L et al; "Influence of tribological additives on friction and impact performane of injection moulded polyacetal", Wear, Elsevier Sequoia, Lausanne, CH, vol. 267, No. 12, Dec. 1, 2009, pp. 2294-2302, XP026751088.
Co-pending U.S. Appl. No. 14/511,788 dated Oct. 10, 2014.
Co-pending U.S. Appl. No. 14/581,148 dated Dec. 23, 2014.

(Continued)

*Primary Examiner* — Ellen M McAvoy
(74) *Attorney, Agent, or Firm* — Dority & Manning, P.A.

(57) ABSTRACT

A tribologically modified polyoxymethylene polymer composition is disclosed. The polyoxymethylene polymer composition is comprised of a polyoxymethylene polymer and at least one tribological modifier. The tribological modifier may comprise at least one tribological modifier comprising an ultra-high molecular weight silicone having a kinematic viscosity of greater than 100,000 $mm^2s^{-1}$. The composition may exhibit a dynamic coefficient of friction against a counter-material of from about 0.01 to about 0.15. The polyoxymethylene polymer compositions provide polymer articles with improved tribological properties and mechanical properties.

32 Claims, No Drawings

(56) References Cited

U.S. PATENT DOCUMENTS

| | | | |
|---|---|---|---|
| 6,821,630 B2 | 11/2004 | Takada et al. | |
| 6,852,677 B2 | 2/2005 | Kurz et al. | |
| 7,056,965 B2 | 6/2006 | Seyama et al. | |
| 7,247,665 B1* | 7/2007 | Woerner | C08K 3/22 524/100 |
| 7,256,966 B2 | 8/2007 | Horio et al. | |
| 7,396,492 B2* | 7/2008 | Price | C08L 59/00 252/511 |
| 7,638,565 B2 | 12/2009 | Harashina | |
| 7,645,821 B2* | 1/2010 | Disch | C08K 5/34922 524/100 |
| 7,821,740 B2 | 10/2010 | Horio et al. | |
| 7,851,585 B2 | 12/2010 | Brison et al. | |
| 7,893,140 B2 | 2/2011 | Hase | |
| 8,097,670 B2 | 1/2012 | Nagai et al. | |
| 8,101,042 B2 | 1/2012 | Gantner et al. | |
| 8,829,085 B2 | 9/2014 | Markgraf et al. | |
| 8,865,805 B2 | 10/2014 | Markgraf et al. | |
| 9,062,183 B2* | 6/2015 | Markgraf | C08L 59/02 |
| 9,303,145 B2* | 4/2016 | Markgraf | C08G 18/56 |
| 9,540,553 B2* | 1/2017 | Markgraf | C08L 59/02 |
| 2003/0039834 A1* | 2/2003 | Gunn | D01F 1/10 428/375 |
| 2003/0195280 A1 | 10/2003 | Disch et al. | |
| 2004/0158005 A1* | 8/2004 | Bloom | C08K 3/04 525/419 |
| 2005/0043492 A1* | 2/2005 | Chin | C08K 5/1539 525/455 |
| 2005/0107513 A1* | 5/2005 | Papke | C08K 7/14 524/494 |
| 2005/0167071 A1 | 8/2005 | Kendall et al. | |
| 2006/0025507 A1 | 2/2006 | Moore et al. | |
| 2007/0032605 A1 | 2/2007 | Harashina | |
| 2007/0066746 A1 | 3/2007 | Gunnewig et al. | |
| 2007/0202332 A1* | 8/2007 | Gunnewig | C08J 3/12 428/402 |
| 2008/0234413 A1 | 9/2008 | Shinohara et al. | |
| 2009/0283931 A1 | 11/2009 | Pfeiffer et al. | |
| 2010/0022691 A1 | 1/2010 | Katsuchi et al. | |
| 2010/0093901 A1 | 4/2010 | Kawaguchi et al. | |
| 2012/0129976 A1* | 5/2012 | Ratnagiri | C08J 3/005 523/400 |
| 2012/0276314 A1 | 11/2012 | Latz et al. | |
| 2013/0331488 A1 | 12/2013 | Markgraf et al. | |
| 2014/0080951 A1* | 3/2014 | Raman | B29C 47/385 524/264 |
| 2015/0065654 A1 | 3/2015 | Markgraf et al. | |
| 2015/0175928 A1* | 6/2015 | Zia | C10M 169/041 508/209 |
| 2015/0274930 A1* | 10/2015 | Jon | C08J 3/226 523/155 |
| 2016/0177219 A1* | 6/2016 | Markgraf | C08L 59/02 508/107 |

FOREIGN PATENT DOCUMENTS

| | | |
|---|---|---|
| DE | 102004057190 | 6/2006 |
| DE | 102008055840 | 5/2010 |
| EP | 1630198 A1 | 1/2006 |
| EP | 2532905 | 12/2012 |
| EP | 2653497 | 10/2013 |
| GB | 1331829 | 9/1973 |
| JP | 01126359 | 5/1989 |
| JP | 01204950 | 8/1989 |
| JP | 04-234450 | 8/1992 |
| JP | 05295230 | 11/1993 |
| JP | 0867798 | 3/1996 |
| JP | 08-311351 | 11/1996 |
| JP | 11 181232 | 7/1999 |
| JP | 11181231 | 7/1999 |
| JP | 2000109702 | 4/2000 |
| JP | 3081610 | 8/2000 |
| JP | 200950985 | 9/2010 |
| WO | 2005/059030 | 6/2005 |
| WO | 2010/073529 | 7/2010 |

OTHER PUBLICATIONS

Co-pending U.S. Appl. No. 14/581,031 dated Dec. 23, 2014.
Tekuma Kunststoff GMBH, Kepital TS-25H data sheet, 1 page, www.tekuma.de.
Mas Rusplast, Our solutions, Polyacetal Kepital: wear-resistant friction units, machine translation, Sep. 6, 2013, 1 page.

* cited by examiner

INTRINSIC LOW FRICTION POLYOXYMETHYLENE

CROSS-REFERENCE TO RELATED APPLICATIONS

The present application claims priority to U.S. Provisional Application Ser. No. 61/893,474 having a filing date of Oct. 21, 2013, which is incorporated herein by reference in its entirety.

BACKGROUND

Polyacetal polymers, which are commonly referred to as polyoxymethylene polymers, have become established as exceptionally useful engineering materials in a variety of applications. For instance, because polyoxymethylene polymers have excellent mechanical properties, fatigue resistance, abrasion resistance, chemical resistance, and moldability, they are widely used in constructing polymer articles, such as articles for use in the automotive industry and the electrical industry.

The mechanical properties of polyoxymethylene molding compositions are one of the reasons for their use in numerous applications. To improve their properties, polyoxymethylene polymers are often provided with additives to adapt the properties for a specific application, for example by using reinforcing fibers or tribological modifiers. For instance, polyoxymethylene polymers have been combined with a tribological modifier for producing polymer compositions well suited for use in tribological applications where the polymer article is in moving contact with other articles, such as metal articles, plastic articles, and the like. These tribological applications can include embodiments where the polymer composition is formed into gear wheels, pulleys, sliding elements, and the like. The addition of a tribological modifier can provide a composition with a reduced coefficient of friction, little frictional noise, and low wear.

In the past, high molecular weight polyolefins have been used to improve the wear resistance of polyoxymethylene resins. For instance, U.S. Pat. No. 5,482,987, which is incorporated herein by reference in its entirety, discloses a self-lubricating, low wear composition containing a polyoxymethylene and a lubricating system comprising a high molecular weight polyethylene, a high density polyethylene, and other components. U.S. Pat. No. 5,641,824, which is incorporated herein by reference in its entirety, discloses a self-lubricating melt blend of a polyoxymethylene and an ultra-high molecular weight polyethylene. However, polyoxymethylene compositions modified with these high molecular weight polyethylene polymers may have a less than desirable surface appearance as well as defects that may detract from the wear properties of the compositions and articles produced therefrom.

Although polyoxymethylene polymers have been tribologically modified in the past, further improvements are still necessary. For instance, a need exists for providing a polyoxymethylene polymer composition and a polymer article produced therefrom with improved tribological properties. In particular, a need exists for providing a polyoxymethylene polymer composition and a polymer article produced therefrom with a reduced coefficient of friction when in contact with other moving articles and improved wear properties.

SUMMARY

According to one embodiment, the present disclosure is directed to a polyoxymethylene polymer composition. The composition is comprised of a polyoxymethylene copolymer and at least one tribological modifier comprising an ultra-high molecular weight silicone having a kinematic viscosity of greater than 100,000 $mm^2s^{-1}$, wherein the polymer composition is substantially free of silicone oil and wherein the polymer composition has a dynamic coefficient of friction against a counter-material of from about 0.01 to about 0.15.

According to another embodiment, the present disclosure is directed to a polymer article. The polymer article is comprised of a polyoxymethylene polymer composition comprising a polyoxymethylene polymer and at least one tribological modifier comprising an ultra-high molecular weight silicone having a kinematic viscosity of greater than 100,000 $mm^2s^{-1}$, wherein the polymer composition is substantially free of silicone oil and wherein the polymer article exhibits a dynamic coefficient of friction against a counter-material of from about 0.01 to less than 0.09.

According to one embodiment, the improved tribological properties of the present invention are exhibited between the composition or polymer article of the present invention and various counter-materials. For instance, the improved tribological properties and coefficient of friction may be exhibited between the composition or polymer article and a polyester surface such as a polyethylene terephthalate surface. In another embodiment, the improved tribological properties and coefficient of friction may be exhibited between the composition or polymer article and a polyacetal surface, a metal surface such as a steel surface, or a polyolefin surface such as a polypropylene surface or a polyethylene surface such as an ultra-high molecular weight polyethylene surface.

Other features and aspects of the present disclosure are discussed in greater detail below.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations.

In general, the present disclosure is directed to a polyoxymethylene polymer composition and a polymer article comprising the polyoxymethylene polymer composition with improved tribological properties such as a reduced coefficient of friction. The tribological properties can be improved by utilizing tribological modifiers. In general, the polyoxymethylene polymer composition comprises a polyoxymethylene polymer and at least one tribological modifier. For instance, the tribological modifier may include boron nitride, ultra-high molecular weight silicone, or a combination thereof.

The present inventors have discovered that by utilizing the polyoxymethylene composition of the present invention, improved sliding properties and a reduced coefficient of friction against other surfaces may be obtained. In particular, the composition and a polymer article made from the composition may exhibit a reduced coefficient of friction against other surfaces or counter-materials while still exhibiting desirable mechanical properties. In addition, these compositions and articles also generate little frictional noise and experience low wear.

Polyoxymethylene Polymer

According to the present disclosure, the polyoxymethylene polymer composition comprises a polyoxymethylene polymer.

The preparation of the polyoxymethylene polymer can be carried out by polymerization of polyoxymethylene-forming monomers, such as trioxane or a mixture of trioxane and a cyclic acetal such as dioxolane in the presence of ethylene glycol as a molecular weight regulator. The polyoxymethylene polymer used in the polymer composition may comprise a homopolymer or a copolymer. According to one embodiment, the polyoxymethylene is a homo- or copolymer which comprises at least 50 mol. %, such as at least 75 mol. %, such as at least 90 mol. % and such as even at least 97 mol. % of —$CH_2$O-repeat units.

In one embodiment, a polyoxymethylene copolymer is used. The copolymer can contain from about 0.1 mol. % to about 20 mol. % and in particular from about 0.5 mol. % to about 10 mol. % of repeat units that comprise a saturated or ethylenically unsaturated alkylene group having at least 2 carbon atoms, or a cycloalkylene group, which has sulfur atoms or oxygen atoms in the chain and may include one or more substituents selected from the group consisting of alkyl cycloalkyl, aryl, aralkyl, heteroaryl, halogen or alkoxy. In one embodiment, a cyclic ether or acetal is used that can be introduced into the copolymer via a ring-opening reaction.

Preferred cyclic ethers or acetals are those of the formula:

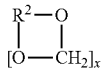

in which x is 0 or 1 and $R^2$ is a $C_2$-$C_4$-alkylene group which, if appropriate, has one or more substituents which are $C_1$-$C_4$-alkyl groups, or are $C_1$-$C_4$-alkoxy groups, and/or are halogen atoms, preferably chlorine atoms. Merely by way of example, mention may be made of ethylene oxide, propylene 1,2-oxide, butylene 1,2-oxide, butylene 1,3-oxide, 1,3-dioxane, 1,3-dioxolane, and 1,3-dioxepan as cyclic ethers, and also of linear oligo- or polyformals, such as polydioxolane or polydioxepan, as comonomers.

It is particularly advantageous to use copolymers composed of from 99.5 to 95 mol. % of trioxane and of from 0.5 to 5 mol. %, such as from 0.5 to 4 mol. %, of one of the above-mentioned comonomers.

The polymerization can be effected as precipitation polymerization or in the melt. By a suitable choice of the polymerization parameters, such as duration of polymerization or amount of molecular weight regulator, the molecular weight and hence the MVR value of the resulting polymer can be adjusted.

In one embodiment, a polyoxymethylene polymer with hydroxyl terminal groups can be produced using a cationic polymerization process followed by solution hydrolysis to remove any unstable end groups. During cationic polymerization, a glycol, such as ethylene glycol can be used as a chain terminating agent. The cationic polymerization results in a bimodal molecular weight distribution containing low molecular weight constituents. In one particular embodiment, the low molecular weight constituents can be significantly reduced by conducting the polymerization using a heteropoly acid such as phosphotungstic acid as the catalyst. When using a heteropoly acid as the catalyst, for instance, the amount of low molecular weight constituents can be less than about 2 wt. %.

A heteropoly acid refers to polyacids formed by the condensation of different kinds of oxo acids through dehydration and contains a mono- or poly-nuclear complex ion wherein a hetero element is present in the center and the oxo acid residues are condensed through oxygen atoms. Such a heteropoly acid is represented by the formula:

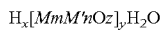

wherein

M represents an element selected from the group consisting of P, Si, Ge, Sn, As, Sb, U, Mn, Re, Cu, Ni, Ti, Co, Fe, Cr, Th or Ce, M' represents an element selected from the group consisting of W, Mo, V or Nb, m is 1 to 10, n is 6 to 40, z is 10 to 100, x is an integer of 1 or above, and y is 0 to 50.

The central element (M) in the formula described above may be composed of one or more kinds of elements selected from P and Si and the coordinate element (M') is composed of at least one element selected from W, Mo and V, particularly W or Mo.

Specific examples of heteropoly acids are phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid and acid salts thereof. Excellent results have been achieved with heteropoly acids selected from 12-molybdophosphoric acid ($H_3PMo_{12}O_{40}$) and 12-tungstophosphoric acid ($H_3PW_{12}O_{40}$) and mixtures thereof.

The heteropoly acid may be dissolved in an alkyl ester of a polybasic carboxylic acid. It has been found that alkyl esters of polybasic carboxylic acid are effective to dissolve the heteropoly acids or salts thereof at room temperature (25° C.).

The alkyl ester of the polybasic carboxylic acid can easily be separated from the production stream since no azeotropic mixtures are formed. Additionally, the alkyl ester of the polybasic carboxylic acid used to dissolve the heteropoly acid or an acid salt thereof fulfills the safety aspects and environmental aspects and, moreover, is inert under the conditions for the manufacturing of oxymethylene polymers.

Preferably the alkyl ester of a polybasic carboxylic acid is an alkyl ester of an aliphatic dicarboxylic acid of the formula:

wherein n is an integer from 2 to 12, preferably 3 to 6 and

R and R' represent independently from each other an alkyl group having 1 to 4 carbon atoms, preferably selected from the group consisting of methyl, ethyl, n-propyl, iso-propyl, n-butyl, iso-butyl and tert.-butyl.

In one embodiment, the polybasic carboxylic acid comprises the dimethyl or diethyl ester of the above-mentioned formula, such as a dimethyl adipate (DMA).

The alkyl ester of the polybasic carboxylic acid may also be represented by the following formula:

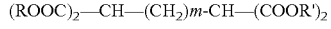

wherein m is an integer from 0 to 10, preferably from 2 to 4 and

R and R' are independently from each other alkyl groups having 1 to 4 carbon atoms, preferably selected from the group consisting of methyl, ethyl, n-propyl, iso-propyl, n-butyl, iso-butyl and tert.-butyl.

Particularly preferred components which can be used to dissolve the heteropoly acid according to the above formula are butantetracarboxylic acid tetratethyl ester or butantetracarboxylic acid tetramethyl ester.

Specific examples of the alkyl ester of a polybasic carboxylic acid are dimethyl glutaric acid, dimethyl adipic acid, dimethyl pimelic acid, dimethyl suberic acid, diethyl glutaric acid, diethyl adipic acid, diethyl pimelic acid, diethyl suberic acid, diemethyl phthalic acid, dimethyl isophthalic acid, dimethyl terephthalic acid, diethyl phthalic acid, diethyl isophthalic acid, diethyl terephthalic acid, butantetracarboxylic acid tetramethylester and butantetracarboxylic acid tetraethylester as well as mixtures thereof. Other examples include dimethylisophthalate, diethylisophthalate, dimethylterephthalate or diethylterephthalate.

Preferably, the heteropoly acid is dissolved in the alkyl ester of the polybasic carboxylic acid in an amount lower than 5 wt. %, preferably in an amount ranging from 0.01 to 5 wt. %, wherein the weight is based on the entire solution.

In some embodiments, the polymer composition of the present disclosure may contain other polyoxymethylene homopolymers and/or polyoxymethylene copolymers. Such polymers, for instance, are generally unbranched linear polymers which contain at least 80%, such as at least 90%, oxymethylene units.

The polyoxymethylene polymer can have any suitable molecular weight. The molecular weight of the polymer, for instance, can be from about 4,000 grams per mole to about 20,000 g/mol. In other embodiments, however, the molecular weight can be well above 20,000 g/mol, such as from about 20,000 g/mol to about 100,000 g/mol.

The polyoxymethylene polymer present in the composition can generally melt flow index (MFI) ranging from about 1 to about 50 g/10 min, as determined according to ISO 1133 at 190° C. and 2.16 kg, though polyoxymethylenes having a higher or lower melt flow index are also encompassed herein. For example, the polyoxymethylene polymer may be a low or mid-molecular weight polyoxymethylene that has a melt flow index of greater than about 5 g/10 min, greater than about 10 g/10 min, or greater than about 15 g/10 min. The melt flow index of the polyoxymethylene polymer can be less than about 25 g/10 min, less than about 20 g/10 min, less than about 18 g/10 min, less than about 15 g/10 min, less than about 13 g/10 min, or less than about 12 g/10 min. The polyoxymethylene polymer may for instance be a high molecular weight polyoxymethylene that has a melt flow index of less than about 5 g/10 min, less than about 3 g/10 min, or less than about 2 g/110 min.

The polyoxymethylene polymer may contain a relatively high amount of functional groups, such as hydroxyl groups in the terminal positions. More particularly, the polyoxymethylene polymer can have terminal hydroxyl groups, for example hydroxyethylene groups and/or hydroxyl side groups, in at least more than about 50% of all the terminal sites on the polymer. It should be understood that the total number of terminal groups present includes all side terminal groups. In addition to the terminal hydroxyl groups, the polyoxymethylene polymer may also have other terminal groups usual for these polymers such as alkoxy groups, formate groups, acetate groups or hemiacetal groups.

The polyoxymethylene polymer may also optionally have a relatively low amount of low molecular weight constituents. As used herein, low molecular weight constituents (or fractions) refer to constituents having molecular weights below 10,000 dalton. In this regard, the polyoxymethylene polymer can contain low molecular weight constituents in an amount less than about 10 wt. %, based on the total weight of the polyoxymethylene. In certain embodiments, for instance, the polyoxymethylene polymer may contain low molecular weight constituents in an amount less than about 5 wt. %, such as in an amount less than about 3 wt. %, such as even in an amount less than about 2 wt. %.

Suitable commercially available polyoxymethylene polymers are available under the trade name Hostaform® (HF) by Celanese/Ticona.

The polyoxymethylene polymer may be present in the polyoxymethylene polymer composition in an amount of at least 60 wt. %, such as at least 70 wt. %, such as at least 80 wt. %, such as at least 85 wt. %, such as at least 90 wt. %, such as at least 95 wt. %. In general, the polyoxymethylene polymer is present in an amount of less than about 100 wt. %, such as less than about 99 wt. %, such as less than about 97 wt. %, wherein the weight is based on the total weight of the polyoxymethylene polymer composition.

Tribological Modifiers

According to the present disclosure, the polyoxymethylene polymer composition and the polymer article comprising the polyoxymethylene polymer composition may comprise at least one tribological modifier. For instance, the polyoxymethylene polymer composition may comprise boron nitride, ultra-high molecular weight silicone, or a combination thereof.

In one embodiment, boron nitride may be used to modify the polyoxymethylene polymer. Boron nitride can be particularly beneficial in improving the tribological properties and reducing the coefficient of friction of polyoxymethylene. Boron nitride exists in a variety of different crystalline forms (e.g., h-BN—hexagonal, c-BN—cubic or spharlerite, and w-BN—wurtzite). In one embodiment, hexagonal boron nitride may be used in the composition. Not to be limited by theory, the h-BN may promote lubricity due to its layered structure and weak secondary forces between adjacent layers allowing or easy sliding of the layers. The boron nitride may have an average particle size ranging from about 0.5 μm to about 10 μm, such as from about 1 μm to about 6 μm, such as about 1.5 μm or 5 μm. The boron nitride may be present in the polyoxymethylene polymer composition in an amount of at least about 0.1 wt. %, such as at least about 0.5 wt. %, such as at least about 0.75 wt. %, such as at least about 1 wt. %, such as at least about 2 wt. % and generally less than about 10 wt. %, such as less than about 5 wt. %, such as less than about 2.5 wt. %, such as less than about 2 wt. %, wherein the weight is based on the total weight of the polyoxymethylene polymer composition. In one embodiment, the composition may be substantially free of the boron nitride such that it is present in an amount of 0 wt. %.

In another embodiment, ultra-high molecular weight silicone (UHMW-Si) may be used to modify the polyoxymethylene polymer. In general, the UHMW-Si can have an average molecular weight of greater than 100,000 g/mol, such as greater than about 200,000 g/mol, such as greater than about 300,000 g/mol, such as greater than about 500,000 g/mol and less than about 3,000,000 g/mol, such as less than about 2,000,000 g/mol, such as less than about 1,000,000 g/mol, such as less than about 500,000 g/mol, such as less than about 300,000 g/mol. Generally, the UHMW-Si can have a kinematic viscosity at 40° C. measured according to DIN 51562 of greater than 100,000 mm²s⁻¹, such as greater than about 200,000 mm²s⁻¹, such as greater than about 1,000,000 mm²s⁻¹, such as greater than about 5,000,000 mm²s⁻¹, such as greater than about 10,000,000 mm²s⁻¹, such as greater than about 15,000,000 mm²s⁻¹ and less than about 50,000,000 mm²s⁻¹, such as less than about 25,000,000 mm²s⁻¹, such as less than about 10,000,000 mm²s⁻¹, such as less than about 1,000,000 mm²s⁻¹, such as less than about 500,000 mm²s⁻¹, such as less than about 200,000 mm²s⁻¹.

The UHMW-Si may comprise a siloxane such as a polysiloxane or polyorganosiloxane. In one embodiment, the UHMW-Si may comprise a dialkylpolysiloxane such as a dimethylsiloxane, an alkylarylsiloxane such as a phenylmethylsilaoxane, or a diarylsiloxane such as a diphenylsiloxane, or a homopolymer thereof such as a polydimethylsiloxane or a polymethylphenylsiloxane, or a copolymer thereof with the above molecular weight and/or kinematic viscosity requirements. The polysiloxane or polyorganosiloxane may also be modified with a substituent such as an epoxy group, a hydroxyl group, a carboxyl group, an amino group or a substituted amino group, an ether group, or a meth(acryloyl) group in the end or main chain of the molecule. The UHMW-Si compounds may be used singly or in combination. Any of the above UHMW-Si compounds may be used with the above molecular weight and/or kinematic viscosity requirements.

The UHMW-Si may be added to the polyoxymethylene polymer composition as a masterbatch wherein the UHMW-Si is dispersed in a polyoxymethylene polymer and the masterbatch is thereafter added to another polyoxymethylene polymer. The masterbatch may comprise from about 10 wt. % to about 50 wt. %, such as from about 35 wt. % to about 45 wt. %, such as about 40 wt. % of an UHMW-Si.

The UHMW-Si may be present in the polyoxymethylene polymer composition in an amount of greater than about 0 wt. %, such as at greater than about 0.1 wt. %, such as at greater than about 0.5 wt. %, such as at greater than about 0.75 wt. %, such as at greater than about 1 wt. %, such as at greater than about 2 wt. %, such as at greater than about 2.5 wt. % and generally less than about 10 wt. %, such as less than about 6 wt. %, such as less than about 5 wt. %, such as less than about 4 wt. %, such as less than about 3.5 wt. %, such as less than about 3 wt. %, wherein the weight is based on the total weight of the polyoxymethylene polymer composition.

According to another embodiment, boron nitride, such as hexagonal-boron nitride, and UHMW-Si may be utilized in combination to modify the polyoxymethylene polymer. The present inventors have discovered that when both tribological modifiers are used simultaneously, the combination can provide a synergistic effect with a resulting polymer composition that exhibits improved tribological properties while maintaining or even improving the mechanical properties. In such embodiments, the boron nitride and UHMW-Si may be utilized in the polyoxymethylene polymer composition in the amounts disclosed above.

According to another embodiment, UHMW-Si may be utilized in combination with PTFE. The present inventors have discovered that when both tribological modifiers are used simultaneously, the combination can provide a synergistic effect with a resulting polymer composition that exhibits improved tribological properties while maintaining or even improving the mechanical properties. In one embodiment, the PTFE may be in the form of a powder. In another embodiment, the PTFE may be in the form of a fiber. When used in combination with UHMW-Si, in one embodiment, the amount of PTFE may be present in an amount of at least 0.1 wt. %, such as at least 1 wt. %, such as at least 5 wt. %, such as at least 10 wt. %, such as at least 15 wt. % and generally less than about 50 wt. %, such as less than about 40 wt. %, such as less than about 30 wt. %, such as less than about 25 wt. %, such as less than about 15 wt. %, such as less than about 10 wt. %. The reduction in PTFE may still provide a composition with desired tribological properties. The PTFE and UHMW-Si may be utilized in the polyoxymethylene polymer composition in the amounts disclosed above.

According to the present disclosure, various other tribological modifiers may be incorporated into the polyoxymethylene polymer composition. These tribological modifiers may include, for instance, calcium carbonate particles, ultrahigh-molecular-weight polyethylene (UHMW-PE) particles, stearyl stearate particles, silicone oil, a polyethylene wax, an amide wax, wax particles comprising an aliphatic ester wax comprised of a fatty acid and a monohydric alcohol, a graft copolymer with an olefin polymer as a graft base, or a combination thereof. These tribological modifiers include the following:

(1) From 0.1-50 wt. %, such as from 1-25 wt. %, of a calcium carbonate particle such as a calcium carbonate (chalk) powder.

(2) From 0.1-50 wt. %, such as from 1-25 wt. %, such as from 2.5-20 wt. %, such as from 5 to 15 wt. %, of an ultrahigh-molecular-weight polyethylene (UHMW-PE) powder. UHMW-PE can be employed as a powder, in particular as a micro-powder. The UHMW-PE generally has a mean particle diameter $D_{50}$ (volume based and determined by light scattering) in the range of 1 to 5000 μm, preferably from 10 to 500 μm, and particularly preferably from 10 to 150 μm such as from 30 to 130 μm, such as from 80 to 150 μm, such as from 30 to 90 μm.

The UHMW-PE can have an average molecular weight of higher than $1.0 \cdot 10^6$ g/mol, such as higher than $2.0 \cdot 10^6$ g/mol, such as higher than $4.0 \cdot 10^6$ g/mol, such as ranging from $1.0 \cdot 10^6$ g/mol to $15.0 \cdot 10^6$ g/mol, such as from $3.0 \cdot 10^6$ g/mol to $12.0 \cdot 10^6$ g/mol, determined by viscosimetry. Preferably, the viscosity number of the UHMW-PE is higher than 1000 ml/g, such as higher than 1500 ml/g, such as ranging from 1800 ml/g to 5000 ml/g, such as ranging from 2000 ml/g to 4300 ml/g (determined according to ISO 1628, part 3; concentration in decahydronaphthalin: 0.0002 g/ml).

(3) From 0.1-10 wt. %, such as from 0.1-5 wt. %, such as from 0.5-3 wt. %, of stearyl stearate.

(4) From 0.1-10 wt. %, such as from 0.5-5 wt. %, such as from 0.8-2 wt. %, of a silicone oil. Alternatively, in one embodiment, the composition may be substantially free of silicone oil, such that the silicone oil is present in an amount of less than about 0.1 wt. %, such as less than about 0.05 wt. %, such as less than about 0.01 wt. %, such as about 0 wt. %. In another embodiment, the composition may not comprise a combination of silicone oil and UHMW-Si alone. In such embodiments, the composition may comprise UHMW-Si, silicone oil, and another tribological modifier, such as a boron nitride or PTFE.

When silicone oil is present in the composition, the silicone oil can have an average molecular weight of at least about 5,000 g/mol, such as at least about 20,000 g/mol, such as at least about 50,000 g/mol and generally less than 100,000 g/mol, such as less than about 75,000 g/mol, such as less than about 50,000 g/mol. The silicone oil can have a kinematic viscosity at 40° C. measured according to DIN 51562 of greater than about 100 mm²s⁻¹, such as greater than about 5,000 mm$^2$s$^{-1}$, such as greater than about 15,000 mm$^2$s$^{-1}$ and generally less than 100,000 mm$^2$s$^{-1}$, such as less than about 50,000 mm$^2$s$^{-1}$, such as less than about 25,000 mm$^2$s$^{-1}$, such as less than about 15,000 mm$^2$s$^{-1}$. The silicone oil may comprise a liquid polysiloxane such as a polydimethylsiloxane at a room temperature of 25° C. with the above molecular weight and/or kinematic viscosity specifications.

(5) From 0.1-5 wt. %, such as from 0.5-3 wt. %, of a polyethylene wax, such as an oxidized polyethylene wax.

(6) From 0.1-5 wt. %, such as from 0.2-2 wt. %, of an amide wax.

(7) From 0.1-5 wt. %, such as from 0.5-3 wt. %, of an aliphatic ester wax composed of a fatty acid and of a monohydric alcohol.

(8) From 0.1-50 wt. %, such as from 1-25 wt. %, such as from 2-10 wt. % by weight of a graft copolymer which has an olefin polymer as a graft base and, grafted on this, at least one vinyl polymer or one ether polymer, and/or a graft copolymer which has an elastomeric core based on polydienes and a hard graft envelope composed of (meth) acrylates and/or of (meth)acrylonitriles. A suitable graft base can be any olefin homopolymer (e.g., polyethylene or polypropylene) or copolymer or copolymers derived from copolymerizable ethylenically unsaturated monomers (e.g, ethylenepropylene copolymers, ethylene-1-butene copolymers, ethylene/glycidyl (meth)acrylate copolymers). Suitable graft monomers are any of the ethylenically unsaturated monomers having a polar group or other graftable monomers having polar groups that modify the polarity of the essentially non-polar graft base (e.g. ethylenically unsaturated carboxylic acids such as (meth)acrylic acid and derivatives thereof in combination with acrylonitrile or styrene/acrylonitrile, if appropriate). In one embodiment, the graft copolymer may comprise a polyethylene or polypropylene graft base grafted with acrylonitrile or with styrene/acrylonitrile.

In general, the tribological modifiers improve the tribological properties of the polyoxymethylene polymer composition by reducing the coefficient of friction and wear when contacted with another surface or counter-material. In addition, in some instances, the tribological modifiers may even improve the mechanical properties of the polyoxymethylene polymer composition and a polymer article produced therefrom.

According to the present disclosure, tribological modifiers improve the tribological properties of the polyoxymethylene polymer compositions and polymer articles produced therefrom without the need for an external lubricant, such as water-based or PTFE-based external lubricants, when utilized in tribological applications. An external lubricant may be a lubricant that is applied to a polymer article or polyoxymethylene based system of the present disclosure. In one embodiment, an external lubricant may not be associated with the polyoxymethylene polymer composition or polymer article such that the external lubricant is not present on a surface of the polyoxymethylene polymer composition or polymer article. In another embodiment, an external lubricant may be utilized with the polyoxymethylene polymer composition and polymer article of the present disclosure.

Other Additives

The polymer composition of the present disclosure may also contain other known additives such as, for example, antioxidants, formaldehyde scavengers, acid scavengers, UV stabilizers or heat stabilizers, reinforcing fibers. In addition, the compositions can contain processing auxiliaries, for example adhesion promoters, lubricants, nucleants, demolding agents, fillers, or antistatic agents and additives which impart a desired property to the compositions and articles or parts produced therefrom.

In one embodiment, an ultraviolet light stabilizer may be present. The ultraviolet light stabilizer may comprise a benzophenone, a benzotriazole, or a benzoate. The UV light absorber, when present, may be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, a formaldehyde scavenger, such as a nitrogen-containing compound, may be present. Mainly, of these are heterocyclic compounds having at least one nitrogen atom as hetero atom which is either adjacent to an amino-substituted carbon atom or to a carbonyl group, for example pyridine, pyrimidine, pyrazine, pyrrolidone, aminopyridine and compounds derived therefrom. Other particularly advantageous compounds are triamino-1,3,5-triazine (melamine) and its derivatives, such as melamine-formaldehyde condensates and methylol melamine. Oligomeric polyamides are also suitable in principle for use as formaldehyde scavengers. The formaldehyde scavenger may be used individually or in combination.

Further, the formaldehyde scavenger may be a guanamine compound which may include an aliphatic guanamine-based compound, an alicyclic guanamine-based compound, an aromatic guanamine-based compound, a hetero atom-containing guanamine-based compound, or the like. The formaldehyde scavenger may be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, an acid scavenger may be present. The acid scavenger may comprise, for instance, an alkaline earth metal salt. For instance, the acid scavenger may comprise a calcium salt, such as a calcium citrate. The acid scavenger may be present in an amount of at least about 0.001 wt. %, such as at least about 0.005 wt. %, such as at least about 0.0075 wt. % and less than about 1 wt. %, such as less than about 0.75 wt. %, such as less than about 0.5 wt. %, wherein the weight is based on the total weight of the respective polymer composition.

In one embodiment, a nucleant may be present. The nucleant may increase crystallinity and may comprise an oxymethylene terpolymer. In one particular embodiment, for instance, the nucleant may comprise a terpolymer of butanediol diglycidyl ether, ethylene oxide, and trioxane. The nucleant may be present in the composition in an amount of at least about 0.01 wt. %, such as at least about 0.05 wt. %, such as at least about 0.1 wt. % and less than about 2 wt. %, such as less than about 1.5 wt. %, such as less than about 1 wt. %, wherein the weight is based on the total weight of the respective polymer composition.

In one embodiment, an antioxidant, such as a sterically hindered phenol, may be present. Examples which are available commercially, are pentaerythrityl tetrakis[3-(3,5-di-tert-butyl-4-hydroxyphenyl)propionate], triethylene glycol bis[3-(3-tert-butyl-4-hydroxy-5-methylphenyl)propionate], 3,3'-bis[3-(3,5-di-tert-butyl-4-hydroxyphenyl) propionohydrazide], and hexamethylene glycol bis[3-(3,5-di-tert-butyl-4-hydroxyphenyl)propionate]. The antioxidant may be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, a light stabilizer, such as a sterically hindered amine, may be present in addition to the ultraviolet light stabilizer. Hindered amine light stabilizers that may be used include oligomeric hindered amine compounds that are N-methylated. For instance, hindered amine light stabilizer may comprise a high molecular weight hindered amine stabilizer. The light stabilizers, when present, may be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, a lubricant, not including the tribological modifiers mentioned above, may be present. The lubricant may comprise a polymer wax composition. Further, in one embodiment, a polyethylene glycol polymer (processing aid) may be present in the composition. The polyethylene glycol, for instance, may have a molecular weight of from about 1000 to about 5000, such as from about 3000 to about 4000. In one embodiment, for instance, PEG-75 may be present. In another embodiment, a fatty acid amide such as ethylene bis(stearamide) may be present. Lubricants may generally be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, a compatibilizer, such as a phenoxy resin, may be present. Generally, the phenoxy resin may be present in the composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, a colorant may be present. Colorants that may be used include any desired inorganic pigments, such as titanium dioxide, ultramarine blue, cobalt blue, and other organic pigments and dyes, such as phthalocyanines, anthraquinnones, and the like. Other colorants include carbon black or various other polymer-soluble dyes. The colorant may be present in the composition in an amount of at least about 0.01 wt. %, such as at least about 0.05 wt. %, such as at least about 0.1 wt. % and less than about 5 wt. %, such as less than about 2.5 wt. %, such as less than about 1 wt. %, wherein the weight is based on the total weight of the respective polymer composition.

In one embodiment, a coupling agent may be present. Coupling agents used include polyfunctional coupling agents, such as trifunctional or bifunctional agents. A suitable coupling agent is a polyisocyanate such as a diisocyanate. The coupling agent may provide a linkage between the polyoxymethylene polymer and the reinforcing fiber and/or sizing material coated on the reinforcing fiber. Generally, the coupling agent is present in an amount of at least about 0.1 wt. %, such as at least about 0.2 wt. % such as at least about 0.3 wt. % and less than about 5 wt. %, such as less than about 3 wt. %, such as less than about 1.5 wt. %. Alternatively, the composition may also be substantially free of any coupling agents such as less than about 0.2 wt. %, such as less than about 0.1 wt. %, such as less than about 0.05 wt. %, such as less than about 0.01 wt. %, such as about 0 wt. %.

In one embodiment, a reinforcing fiber may be present. The reinforcing fibers which may be used according to the present invention include mineral fibers, glass fibers, polymer fibers such as aramid fibers, metal fibers such as steel fibers, carbon fibers, or natural fibers. These fibers may be unmodified or modified, e.g. provided with a sizing or chemically treated, in order to improve adhesion to the polymer. Fiber diameters can vary depending upon the particular fiber used and whether the fiber is in either a chopped or a continuous form. The fibers, for instance, can have a diameter of from about 5 µm to about 100 µm, such as from about 5 µm to about 50 µm, such as from about 5 µm to about 15 µm. When present, the respective composition may contain reinforcing fibers in an amount of at least 1 wt. %, such as at least 5 wt. %, such as at least 7 wt. %, such as at least 10 wt. %, such as at least 15 wt. % and generally less than about 50 wt. %, such as less than about 45 wt. %, such as less than about 40 wt. %, such as less than about 30 wt. %, such as less than about 20 wt. %, wherein the weight is based on the total weight of the respective polyoxymethylene polymer composition. Alternatively, the polyoxymethylene polymer composition may also be substantially free of any reinforcing fibers, such that the composition contains fibers in an amount of less than about 0.1 wt. %, such as less than about 0.05 wt. %, such as less than about 0.01 wt. %, such as about 0 wt. %.

Polymer Articles

The compositions of the present disclosure can be compounded and formed into a polymer article using any technique known in the art. For instance, the respective composition can be intensively mixed to form a substantially homogeneous blend. The blend can be melt kneaded at an elevated temperature, such as a temperature that is higher than the melting point of the polymer utilized in the polymer composition but lower than the degradation temperature. Alternatively, the respective composition can be melted and mixed together in a conventional single or twin screw extruder. Preferably, the melt mixing is carried out at a temperature ranging from 100 to 280° C., such as from 120 to 260° C., such as from 140 to 240° C. or 180 to 220° C. However, such processing should be conducted for each respective composition at a desired temperature to minimize any polymer degradation.

After extrusion, the compositions may be formed into pellets. The pellets can be molded into polymer articles by techniques known in the art such as injection molding, thermoforming, blow molding, rotational molding and the like. According to the present disclosure, the polymer articles demonstrate excellent tribological behavior and mechanical properties. Consequently, the polymer articles can be used for several applications where low wear and excellent gliding properties are desired.

Polymer articles include any moving articles or moldings that are in contact with another surface and may require high tribological requirements. For instance, polymer articles include articles for the automotive industry, especially housings, latches such as rotary latches, window winding systems, wiper systems, pulleys, sun roof systems, seat adjustments, levers, bushes, gears, gear boxes, claws, pivot housings, wiper arms, brackets or seat rail bearings, zippers, switches, cams, rollers or rolling guides, sliding elements or glides such as sliding plates, conveyor belt parts such as chain elements and links, castors, fasteners, levers, conveyor system wear strips and guard rails, medical equipment such as medical inhalers and injectors. An almost limitless variety of polymer articles may be formed from the polymer compositions of the present disclosure.

Properties

Utilizing the polyoxymethylene polymer composition and polymer article produced therefrom according to the present disclosure provides compositions and articles with improved tribological properties. According to the present disclosure, the tribological properties are generally measured by the coefficient of friction.

In general, static friction is the friction between two or more surfaces that are not moving relative to each other (ie., both objects are stationary). In general, dynamic friction occurs when two objects are moving relative to each other (ie., at least one object is in motion or repeated back and forth motion). In addition, stick-slip is generally known as a phenomenon caused by continuous alternating between static and dynamic friction.

According to the present disclosure, the composition and polymer article may exhibit a static coefficient of friction against another surface, as determined according to VDA 230-206, of greater than about 0.01, such as greater than about 0.02, such as greater than about 0.03, such as greater than about 0.04, such as greater than about 0.05, such as greater than about 0.06 and generally less than about 0.2, such as less than about 0.18, such as less than about 0.15, such as less than about 0.12, such as less than about 0.1, such as less than about 0.9, such as less than about 0.8, such as less than about 0.7, such as less than about 0.6.

According to the present disclosure, the composition and polymer article may exhibit a dynamic coefficient of friction against another surface, as determined according to VDA 230-206, of greater than about 0.01, such as greater than about 0.02, such as greater than about 0.03, such as greater than about 0.04, such as greater than about 0.05, such as greater than about 0.06 and generally less than about 0.2, such as less than about 0.18, such as less than about 0.15, such as less than about 0.12, such as less than about 0.1, such as less than about 0.9, such as less than about 0.8, such as less than about 0.7, such as less than about 0.6.

In addition, the effect of sliding speed on the dynamic coefficient of friction was also measured at speeds of 0.1 mm/s, 1 mm/s, 10 mm/s, and 100 mm/s. This test method utilizes a ball-on-prism configuration where a ball made of a plastic or metal rotates uni-directionally against the plate of a counter material. At a speed of 0.1 mm/s, the dynamic coefficient of friction against another surface is greater than about 0.02, such as greater than about 0.03, such as greater than about 0.04, such as greater than about 0.05 and generally less than about 0.1, such as less than about 0.08, such as less than about 0.07, such as less than about 0.06. At a speed of 1 mm/s, the dynamic coefficient of friction against another surface is greater than about 0.02, such as greater than about 0.03, such as greater than about 0.04, such as greater than about 0.05 generally less than about 0.1, such as less than about 0.08, such as less than about 0.07, such as less than about 0.06. At a speed of 10 mm/s, the dynamic coefficient of friction against another surface is greater than about 0.03, such as greater than about 0.04, such as greater than about 0.05, such as greater than about 0.06 and generally less than about 0.15, such as less than about 0.12, such as less than about 0.1, such as less than about 0.09, such as less than about 0.08, such as less than about 0.07. At a speed of 100 mm/s, the dynamic coefficient of friction against another surface is greater than about 0.05, such as greater than about 0.07, such as greater than about 0.08, such as greater than about 0.09 and generally less than about 0.17, such as less than about 0.15, such as less than about 0.12, such as less than about 0.1, such as less than about 0.09, such as less than about 0.08.

In one embodiment, the above static coefficient of friction and dynamic coefficient of friction values and effect of sliding speed on the dynamic coefficient of friction are exhibited between the composition or polymer article and various counter-materials. For instance, the above values may be exhibited between the composition or polymer article and a polyester surface such as a polyethylene terephthalate surface. In another embodiment, the above values may be exhibited between the composition or polymer article and a polyacetal surface, a metal surface such as a steel surface, or a polyolefin surface such as a polypropylene surface or a polyethylene surface such as an ultra-high molecular weight polyethylene surface.

In one embodiment, the composition and articles of the present disclosure may exhibit improved wear properties when compared to polyoxymethylene compositions and articles that are not modified with a tribological modifier. The wear tests may be conducted utilizing a steel shaft, a shaft diameter of 65 mm, a roughness of 0.8 μm, a load of 3.1 N, a sliding velocity of 136 m/min, a test duration of 60 h, and a distance of 490 km. The compositions of the present disclosure may exhibit at least 20% reduced wear, such as at least 40% reduced wear, such as at least 50% reduced wear, such as at least 60% reduced wear, such as at least 80% reduced wear and less than about 100% reduced wear, such as less than about 90% reduced wear, such as less than about 80% reduced wear, when compared to the wear of a polyoxymethylene polymer that is not modified with a tribological modifier.

While the polyoxymethylene polymer composition and polymer articles produced therefrom of the present invention provide improved tribological properties, the compositions and articles may also exhibit improved mechanical properties. For instance, the modulus of elasticity, determined according to ISO Test No. 527, of the composition or polymer article may be greater than about 2000 MPa, such as greater than about 2200 MPa, such as greater than about 2400 MPa, such as greater than about 2500 MPa, such as greater than about 2600 MPa and generally less than about 10000 MPa, such as less than about 7500 MPa, such as less than about 5000 MPa, such as less than about 4000 MPa, such as less than about 3500 MPa, such as less than about 3000 MPa.

In one embodiment, the polymer article or molded polymer article may have topographical features that may provide surface characteristics and/or surface roughness on at least one surface of the article. For instance, the features may be ridges, valleys, protrusions, and the like on the surface of the article. These features may be present at the nanoscale or microscale level. Not to be limited by theory, the surface roughness may be produced during the molding of specific polymer articles. Surface roughness may also be produced depending on the particular additives present in the composition.

When in contact with a counter material, the surface roughness of the article may contribute to a reduced dynamic coefficient of friction when compared to the dynamic coefficient of friction of an article that exhibits a lesser degree of surface roughness. For instance, the dynamic coefficient of friction of an article exhibiting surface roughness may be less than the dynamic coefficient of friction of an article that is substantially free of surface roughness.

The surface roughness depth (Rz) may be measured according to DIN 4768 using a profilometer or roughness tester. The average surface roughness depth represents the mean from the individual depths of roughness of five individual lines. For instance, the measurements are made between the highest and lowest points on the surface averaged over five individual lengths.

In one embodiment, the article produced according to the present disclosure may have an average surface area roughness of greater than about 0.1 µm, such as greater than about 0.25 µm, such as greater than about 0.50 µm, such as greater than about 1 µm, such as greater than about 2.5 µm, such as greater than about 5 µm and less than about 30 µm, such as less than about 20 µm, such as less than about 15 µm, such as less than about 10 µm, such as less than about 5 µm, such as less than about 2.5 µm, such as less than about 1 µm.

The present disclosure may be better understood with reference to the following examples.

EXAMPLES

The examples of the invention are given below by way of illustration and not by way of limitation. The following experiments were conducted in order to show some of the benefits and advantages of the present invention.

Various polymer compositions comprising a polyoxymethylene polymer and at least one tribological modifier were produced in accordance with the present disclosure. In particular, the tribological modifiers included hexagonal-boron nitride, ultra-high molecular weight silicone, ultra-high molecular weight polyethylene wax, silicone oil, and polytetrafluoroethylene.

The components of each respective composition were mixed together and compounded using a ZSK 25MC (Werner & Pfleiderer, Germany) twin screw extruder (zone temperature 190° C., melt temperature about 210° C.). The screw configuration with kneading elements was chosen so that effective thorough mixing of the components took place. The compositions were extruded and pelletized. The pellets were dried for 8 hours at 120° C. and then injection molded.

The compositions/molds were tested for a variety of tribological and physical properties. The results are provided in the tables below:

Example 1

In this example, the tribological properties (coefficient of friction and effect of sliding speed on the dynamic coefficient of friction) were determined between the polyoxymethylene composition and a polyethylene terephthalate surface.

Stick-slip tests were conducted to determine the dynamic coefficient of friction and the static coefficient of friction. Stick-slip tests were conducted according to VDA 230-206. A ball-on-plate configuration was utilized with a load of 12.5 N, sliding speed of 8 mm/s, and a test duration of 8 minutes.

Using a ball-on-prism test, the sliding speed was adjusted to determine the effect on the dynamic coefficient of friction. The sliding speed effect on the dynamic coefficient of friction was determined by applying a load of 10 N and then increasing the sliding speed gradually from 0 to 500 mm/s. The dynamic coefficient of friction was determined as a function of sliding speed.

Samples 1-4 exhibited a higher degree of surface roughness in comparison to Samples 5-10.

|  |  | Sample 1 | Sample 2 | Sample 3 | Sample 4 |
|---|---|---|---|---|---|
| POM copolymer (wt. %) (HF C9021) | | 95.2 | 96.2 | 97.2 | 98 |
| h-BN (wt. %) | | 1.0 | 1.0 | 0 | 2.0 |
| UHMW-Si (wt. %) | | 2.8 | 2.8 | 2.8 | 0 |
| Wax (wt. %) | | 1.0 | 0 | 0 | 0 |
| Silicone oil (wt. %) | | 0 | 0 | 0 | 0 |
| PTFE (wt. %) | | 0 | 0 | 0 | 0 |
| Stick-slip test | Dynamic CoF | 0.044 | 0.040 | 0.042 | 0.045 |
|  | Static CoF | 0.052 | 0.047 | 0.052 | 0.050 |
| Sliding speed effect on dynamic coefficient of friction | 0.1 mm/s | 0.036 | 0.058 | 0.052 | 0.056 |
|  | 1 mm/s | 0.037 | 0.054 | 0.045 | 0.043 |
|  | 10 mm/s | 0.061 | 0.056 | 0.047 | 0.071 |
|  | 100 mm/s | 0.096 | 0.099 | 0.080 | 0.055 |

|  |  | Sample 5 | Sample 6 | Sample 7 | Sample 8 | Sample 9 | Sample 10 |
|---|---|---|---|---|---|---|---|
| POM copolymer (wt. %) (HF C9021) | | 99.5 | 99.0 | 98.0 | 98.4 | 98 | 97.2 |
| h-BN (wt. %) | | 0.5 | 1.0 | 2.0 | 0 | 0 | 0 |
| UHMW-Si (wt. %) | | 0 | 0 | 0 | 1.6 | 2.0 | 2.8 |
| Wax (wt. %) | | 0 | 0 | 0 | 0 | 0 | 0 |
| Silicone oil (wt. %) | | 0 | 0 | 0 | 0 | 0 | 0 |
| PTFE (wt. %) | | 0 | 0 | 0 | 0 | 0 | 0 |
| Stick-slip test | Dynamic CoF | 0.111 | 0.115 | 0.081 | 0.093 | 0.095 | 0.079 |
|  | Static CoF | 0.127 | 0.127 | 0.091 | 0.104 | 0.108 | 0.095 |
| Sliding speed effect on dynamic | 0.1 mm/s | 0.117 | 0.074 | 0.073 | 0.037 | 0.025 | 0.028 |
|  | 1 mm/s | 0.087 | 0.078 | 0.075 | 0.035 | 0.033 | 0.031 |

| | | | | | | | |
|---|---|---|---|---|---|---|---|
| coefficient of friction | 10 mm/s | 0.103 | 0.084 | 0.074 | 0.067 | 0.063 | 0.042 |
| | 100 mm/s | 0.148 | 0.079 | 0.079 | 0.119 | 0.108 | 0.075 |

| | | Sample 11 | Sample 12 | Sample 13 |
|---|---|---|---|---|
| POM copolymer (wt. %) (HF C9021) | | 95.2 | 96.9 | 80.35 |
| h-BN (wt. %) | | 1.0 | 1.0 | 0 |
| UHMW-Si (wt. %) | | 2.8 | 1.6 | 3.0 |
| Wax (wt. %) | | 0 | 0 | 0 |
| Silicone oil (wt. %) | | 1.0 | 0.5 | 0 |
| PTFE (wt. %) | | 0 | 0 | 16.65 |
| Stick-slip test | Dynamic CoF | 0.085 | 0.077 | 0.068 |
| | Static CoF | 0.098 | 0.087 | 0.085 |
| Sliding speed effect on dynamic coefficient of friction | 0.1 mm/s | 0.024 | 0.051 | 0.026 |
| | 1 mm/s | 0.028 | 0.061 | 0.033 |
| | 10 mm/s | 0.040 | 0.113 | 0.044 |
| | 100 mm/s | 0.094 | 0.147 | 0.071 |

Example 2

The modulus of elasticity was tested according to ISO Test No. 527 (technically equivalent to ASTM D 638). Modulus measurements were conducted at a temperature of 23° C. using a dumbbell shaped specimen with a length of about 165 mm, thickness of about 4 mm, and width in the gage area of about 10 mm.

| | Comparative Sample 1 | Sample 14 | Sample 15 | Sample 16 | Sample 17 | Sample 18 | Sample 19 |
|---|---|---|---|---|---|---|---|
| POM copolymer (co-monomer content of 3.4%) (wt. %) (HF C9021) | 100 | 99.5 | 99.0 | 98.0 | 98.8 | 98.4 | 98.0 |
| POM copolymer (co-monomer content of 1.4%) (wt. %) (HF C13031) | 0 | 0 | 0 | 0 | 0 | 0 | 0 |
| POM copolymer (co-monomer content of 0.7%) (wt. %) (HF HS90) | 0 | 0 | 0 | 0 | 0 | 0 | 0 |
| h-BN (wt. %) | 0 | 0.5 | 1.0 | 2.0 | 0 | 0 | 0 |
| UHMW-Si (wt. %) | 0 | 0 | 0 | 0 | 1.2 | 1.6 | 2.0 |
| Modulus of Elasticity (MPa) | 2822 | 2849 | 2855 | 2879 | 2683 | 2621 | 2598 |

| | Sample 20 | Sample 21 | Sample 22 | Sample 23 | Sample 24 | Sample 25 |
|---|---|---|---|---|---|---|
| POM copolymer (co-monomer content of 3.4%) (wt. %) (HF C9021) | 97.2 | 96.2 | 0 | 0 | 0 | 0 |
| POM copolymer (co-monomer content of 1.4%) (wt. %) (HF C13031) | 0 | 0 | 97.2 | 96.2 | 0 | 0 |
| POM copolymer (co-monomer content of 0.7%) (wt. %) (HF HS90) | 0 | 0 | 0 | 0 | 97.2 | 96.2 |
| h-BN (wt. %) | 0 | 1.0 | 0 | 1.0 | 0 | 1.0 |
| UHMW-Si (wt. %) | 2.8 | 2.8 | 2.8 | 2.8 | 2.8 | 2.8 |
| Modulus of Elasticity (MPa) | 2544 | 2770 | 2712 | 2933 | 2880 | 3124 |

Example 3

Stick-slip tests were conducted to compare a new mold and a tested or used mold. New molds were tested after injection molding. Used molds were produced by conveying materials on new molds for a certain period of time to simulate a used mold.

Stick-slip tests were conducted to determine the dynamic coefficient of friction and the static coefficient of friction. Stick-slip tests were conducted according to VDA 230-206. A ball-on-plate configuration was utilized with a load of 12.5 N, sliding speed of 8 mm/s, and a test duration of 8 minutes.

In this example, the tribological properties (coefficient of friction and effect of sliding speed on the dynamic coefficient of friction) were determined between the polyoxymethylene composition and a polyethylene terephthalate surface.

terephthalate (PET) surface. In Sample 35, the composition was tested against a polypropylene (PP) surface. In Sample 36, the composition was tested against a steel surface. In Comparative Sample 2, a polyoxymethylene sample without UHMW-Si was tested against the same polyoxymethylene sample.

Stick-slip tests were conducted to determine the dynamic coefficient of friction and the static coefficient of friction. Stick-slip tests were conducted according to VDA 230-206. A ball-on-plate configuration was utilized with a load of 12.5 N, sliding speed of 8 mm/s, a test duration of 8 minutes and a test temperature of 23° C.

|  |  | Sample 26 | Sample 27 | Sample 28 | Sample 29 | Sample 30 | Sample 31 |
|---|---|---|---|---|---|---|---|
| POM copolymer (co-monomer content of 3.4%) (wt. %) (HF C9021) | | — | — | 97.2 | 97.2 | — | — |
| POM copolymer (co-monomer content of 1.4%) (wt. %) (HF C13031) | | 98.5 | 97.8 | — | — | 93 | 93 |
| PE Wax (wt. %) | | 1.0 | 1.0 | — | — | — | — |
| PTFE (wt. %) | | 0.5 | 0.5 | 1.8 | 1.8 | — | — |
| Silicone oil (wt. %) | | — | — | 1.0 | 1.0 | 2 | 2 |
| Modifier | | — | — | — | — | 5 | 5 |
| New or Used | | New | Used | New | Used | New | Used |
| Stick-slip test | Dynamic CoF | 0.06 | 0.06 | 0.06 | 0.07 | 0.07 | 0.09 |
|  | Static CoF | 0.07 | 0.07 | 0.07 | 0.08 | 0.08 | 0.10 |

|  | Comparative Sample 2 | Sample 32 | Sample 33 | Sample 34 | Sample 35 | Sample 36 |
|---|---|---|---|---|---|---|
| Counter Material | POM (w/o UHMW-Si) (HF C9021) | POM (w/o UHMW-Si) (HF C9021) | POM w/2.8 wt. % UHMW-Si | PET | PP | Steel |
| Dynamic CoF | 0.225 | 0.049 | 0.035 | 0.080 | 0.059 | 0.049 |
| Static CoF | 0.239 | 0.058 | 0.042 | 0.092 | 0.070 | 0.057 |

Example 4

In this example, the tribological properties (coefficient of friction and effect of sliding speed on the dynamic coefficient of friction) were determined between the polyoxymethylene composition and various surfaces. The polyoxymethylene composition was comprised of 2.8 wt. % UHMW-Si.

In Sample 32, the composition was tested against a polyoxymethylene surface without UHMW-Si. In Sample 33, the composition was tested against a polyoxymethylene composition comprising 2.8 wt. % UHMW-Si. In Sample 34, the composition was tested against a polyethylene Testing was also conducted using a load of 30 N and a test duration of 45 minutes. Noticeable differences between the results of these tests were not observed.

Example 5

High speed tests were conducted to determine the tribological properties against an ultrahigh molecular weight polyethylene surface.

A ball-on-prism configuration was utilized with a load of 5 N, sliding speed of 1000 mm/s, a test duration of 10 minutes. The data was extrapolated to 60 minutes to determine the long term tribological performance of the materials. The depth of wear in the article was also determined.

Comparative Samples 3-6 include tribologically modified polyoxymethylene with modifiers other than UHMW-Si. Sample 37 is comprised of a polyoxymethylene composition with 2.8 wt. % UHMW-Si.

|  | Comparative Sample 3 | Comparative Sample 4 | Comparative Sample 5 | Comparative Sample 6 | Sample 37 |
| --- | --- | --- | --- | --- | --- |
| Dynamic CoF | 0.58 | 0.571 | 0.578 | 0.616 | 0.2 |
| Depth of wear (μm/hr) | 4307 | 7837 | 5424 | 3868 | 490 |

Example 6

High speed, block-on-shaft tests were conducted to determine the abrasive wear against a steel surface. The wear tests were conducted utilizing a steel shaft, a shaft diameter of 65 mm, a roughness of 0.8 μm, a load of 3.1 N, a sliding velocity of 136 m/min, a test duration of 60 h, and a distance of 490 km.

Comparative Sample 7 utilized polyoxymethylene without tribological modifiers. Comparative Sample 8 was comprised of polyoxymethylene and 18 wt. % PTFE. Sample 38 was comprised of polyoxymethylene and 2.8 wt. % UHMW-Si. The surface wear was determined. The wear % reported is based relative to Comparative Sample 7.

|  | Comparative Sample 7 | Comparative Sample 8 | Sample 38 |
| --- | --- | --- | --- |
| Wear % | 100 | 47 | 39 |

Based on the above, the wear percent of Comparative Sample 8 was 47% of the wear of Comparative Sample 7. The wear percent of Sample 38 was 39% of the wear of Comparative Sample 7.

Example 7

High speed tests were conducted to determine the tribological properties against a polyoxymethylene surface that was not tribologically modified.

Stick-slip tests were conducted to determine the dynamic coefficient of friction. Stick-slip tests were conducted according to VDA 230-206. A ball-on-plate configuration was utilized with a load of 5 N, sliding speed of 1000 mm/s, a test duration of 10 minutes. The data was extrapolated to 60 minutes to determine the long term tribological performance of the materials. The depth of wear was also determined.

Comparative Sample 9 utilized polyoxymethylene without tribological modifiers tested against the same polyoxymethylene without tribological modifiers. Sample 39 was comprised of a polyoxymethylene and 2.8 wt. % UHMW-Si and was tested against a polyoxymethylene without tribological modifiers.

|  | Comparative Sample 9 | Sample 39 |
| --- | --- | --- |
| Dynamic CoF | 0.41 | 0.12 |
| Depth of wear (μm/hr) | 800 | 37.8 |

Example 8

In this example, stick slip tests were conducted to determine the coefficient of friction between a tribologically modified polyoxymethylene and a polypropylene (PP) surface and an unmodified polyoxymethylene (POM) surface.

Stick-slip tests were conducted to determine the dynamic coefficient of friction and the static coefficient of friction. Stick-slip tests were conducted according to VDA 230-206. A ball-on-plate configuration was utilized with a load of 12.5 N, sliding speed of 8 mm/s, and a test duration of 8 minutes.

|  |  | Sample 40 | Sample 41 | Sample 42 | Sample 43 | Sample 44 | Sample 45 |
| --- | --- | --- | --- | --- | --- | --- | --- |
| POM copolymer (wt. %) (HF C9021) |  | 82 | 100 | 94 | 95 | 93.25 | 93 |
| UHMW-Si (wt. %) |  | 0 | 0 | 3 | 2 | 2 | 3 |
| PTFE (wt. %) |  | 18 | 0 | 3 | 3 | 4.75 | 4 |
| Stick-slip test | Dynamic CoF vs. PP | 0.129 | 0.122 | 0.034 | 0.047 | 0.035 | 0.045 |
|  | Dynamic CoF vs. POM | 0.078 | 0.397 | 0.033 | 0.045 | 0.035 | 0.032 |
| Modulus (MPa) |  | 2500 | 2850 | 2300 | 2400 | 2300 | 2300 |
| Strain at yield (%) |  | 7 | 9 | 10 | 11 | 11 | 11 |
| Charpy Notched Impact (kJ/m²) |  | 4 | 6.5 | 5 | 4.6 | 4.1 | 5.3 |

|  |  | Sample 46 | Sample 47 | Sample 48 | Sample 49 | Sample 50 |
| --- | --- | --- | --- | --- | --- | --- |
| POM copolymer (wt. %) (HF C9021) |  | 92.375 | 96 | 91.125 | 93 | 92 |
| UHMW-Si (wt. %) |  | 3 | 1 | 1 | 1 | 2 |
| PTFE (wt. %) |  | 4.625 | 4 | 4.875 | 3 | 4 |
| Stick-slip test | Dynamic CoF vs. PP | 0.038 | 0.062 | 0.051 | 0.066 | 0.035 |
|  | Dynamic CoF vs. POM | 0.032 | 0.052 | 0.048 | 0.043 | 0.036 |

| | | | | | |
|---|---|---|---|---|---|
| Modulus (MPa) | 2300 | 2400 | 2400 | 2400 | 2300 |
| Strain at yield (%) | 11 | 10.9 | 11.0 | 10.7 | 10.8 |
| Charpy Notched Impact (kJ/m$^2$) | 5 | 5.4 | 5.3 | 5.1 | 5.3 |

| | Sample 51 | Sample 52 | Sample 53 |
|---|---|---|---|
| POM copolymer (wt. %) (HF C9021) | 80.9 | 80.35 | 79.8 |
| UHMW-Si (wt. %) | 2 | 3 | 4 |
| PTFE (wt. %) | 17.1 | 16.65 | 16.2 |
| Stick-slip test Dynamic CoF vs. PP | 0.06 | 0.048 | 0.042 |
| Dynamic CoF vs. POM | 0.29 | 0.026 | 0.030 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part.

Furthermore, those of ordinary skill in the art will appreciate that the foregoing description is by way of example only, and is not intended to limit the invention so further described in such appended claims.

The invention claimed is:

1. A polyoxymethylene polymer composition, the polyoxymethylene polymer composition comprising
a polyoxymethylene copolymer combined with a nucleant, the nucleant comprising an oxymethylene terpolymer, and
at least one tribological modifier comprising an ultra-high molecular weight silicone having a kinematic viscosity at 40° C. of greater than 100,000 mm$^2$s$^{-1}$,
wherein the polymer composition is substantially free of silicone oil, and
wherein the polymer composition has a dynamic coefficient of friction against a counter-material of from about 0.01 to about 0.15, the dynamic coefficient of friction being tested according to VDA Test 230-206 using ball-on-plate configuration with a load of 12.5 N, a sliding speed of 8 mm/s and a test duration of 8 minutes, and wherein the counter material is a polyester surface, a steel surface, or a polypropylene surface.

2. The polymer composition of claim 1, wherein the nucleant is present in the composition in an amount from about 0.01% by weight to about 2% by weight.

3. The polymer composition of claim 1, wherein the polyoxymethylene copolymer contains comonomer units in an amount from about 0.5 mol % to about 5 mol %.

4. The polymer composition of claim 1, wherein the polyoxymethylene copolymer has a melt flow index of greater than about 5 g/10 min.

5. The polymer composition of claim 1, wherein the ultra-high molecular weight silicone is present in an amount of from about 0.1 to about 10 wt. %.

6. The polymer composition of claim 1, wherein the tribological modifier further comprises a hexagonal boron nitride in an amount of from about 0.1 to about 5 wt. %.

7. The polymer composition of claim 6, wherein the hexagonal boron nitride has a particle size of less than 10 μm.

8. The polymer composition of claim 1, wherein the tribological modifier further comprises polytetrafluoroethylene in an amount of from about 0.1 to about 50 wt. %.

9. The polymer composition claim 1, wherein the composition further comprises a polyethylene wax in an amount of from about 0.1 to about 5 wt. %, an amide wax in an amount of from about 0.1 to about 5 wt. %, or a combination thereof.

10. The polymer composition of claim 1, wherein the composition further comprises calcium carbonate particles, ultrahigh molecular weight polyethylene, stearyl stearate, an aliphatic ester wax composed of a fatty acid and of a monohydric alcohol, a graft copolymer comprising a polyethylene or polypropylene graft base grafted with an acrylonitrile or with a styrene/acrylonitrile copolymer, or a combination thereof.

11. The polymer composition of claim 1, wherein the counter-material is the polyester surface, the polyester surface comprising a polyethylene terephthalate surface.

12. The polymer composition of claim 1, wherein the composition has a dynamic coefficient of friction against the counter-material of from about 0.05 to less than 0.09.

13. The polymer composition of claim 1, wherein the composition has a modulus of elasticity measured according to ISO Test No. 527 of at least about 2000 MPa.

14. The polymer composition of claim 1, wherein the composition is substantially free of a reinforcing fiber.

15. A polymer article made from the composition of claim 1, the polymer article comprising a gear, a lever, a cam, a roller, a sliding element, a pulley, a latch, a claw, a wiper arm, a conveyor component, a medical inhaler, or a medical injector.

16. A polymer article comprising a polyoxymethylene polymer composition as defined in claim 1.

17. The polymer article of claim 16, wherein the polymer article has a surface roughness determined according to DIN 4768 of greater than about 0.1 μm and less than about 30 μm.

18. A polyoxymethylene polymer composition, the polyoxymethylene polymer composition comprising
a polyoxymethylene copolymer having a melt flow index of less than about 50 g/10 min, and
at least one tribological modifier comprising an ultra-high molecular weight silicone having a kinematic viscosity at 40° C. of greater than 100,000 mm$^2$s$^{-1}$,
wherein the polymer composition is substantially free of silicone oil, and
wherein the polymer composition has a dynamic coefficient of friction against a counter-material of from about 0.01 to about 0.15, the dynamic coefficient of friction being tested according VDA Test 230-206 using a ball-on-plate configuration with a load of 12.5 N sliding seed of 8 mm/s and a test duration of 8 minutes, and wherein the counter material is a polyester surface, a steel surface, or a polypropylene surface.

19. The polymer composition of claim 18, wherein the composition further contains a nucleant comprising an oxymethylene terpolymer.

20. The polymer composition of claim 18, wherein the nucleant is present in the composition in an amount from about 0.01% by weight to about 2% by weight.

21. The polymer composition of claim 18, wherein the polyoxymethylene copolymer contains comonomer units in an amount from about 0.5 mol % to about 5 mol %.

22. The polymer composition of claim 18, wherein the polyoxymethylene copolymer has a melt flow index of greater than about 5 g/10 min.

23. The polymer composition of claim 18, wherein the ultra-high molecular weight silicone is present in an amount of from about 0.1 to about 10 wt. %.

24. The polymer composition of claim 18, wherein the tribological modifier further comprises a hexagonal boron nitride in an amount of from about 0.1 to about 5 wt. %.

25. The polymer composition of claim 18, wherein the tribological modifier further comprises polytetrafluoroethylene in an amount of from about 0.1 to about 50 wt. %.

26. The polymer composition claim 18, wherein the composition further comprises a polyethylene wax in an amount of from about 0.1 to about 5 wt. %, an amide wax in an amount of from about 0.1 to about 5 wt. %, or a combination thereof.

27. The polymer composition of claim 18, wherein the composition further comprises calcium carbonate particles, ultrahigh molecular weight polyethylene, stearyl stearate, an aliphatic ester wax composed of a fatty acid and of a monohydric alcohol, a graft copolymer comprising a polyethylene or polypropylene graft base grafted with an acrylonitrile or with a styrene/acrylonitrile copolymer, or a combination thereof.

28. The polymer composition of claim 18, wherein the counter-material is the polyester surface, the polyester surface comprising a polyethylene terephthalate surface.

29. The polymer composition of claim 18, wherein the composition has a modulus of elasticity measured according to ISO Test No. 527 of at least about 2000 MPa.

30. The polymer composition of claim 18, wherein the composition is substantially free of a reinforcing fiber.

31. A polymer article made from the composition of claim 18, the polymer article comprising a gear, a lever, a cam, a roller, a sliding element, a pulley, a latch, a claw, a wiper arm, a conveyor component, a medical inhaler, or a medical injector.

32. A polyoxymethylene polymer composition, the polyoxymethylene polymer composition comprising
a polyoxymethylene copolymer having a melt flow index of less than about 50 g/10 min, and
at least one tribological modifier comprising an ultra-high molecular weight silicone having a kinematic viscosity at 40° C. of greater than 100,000 mm$^2$s$^{-1}$,
reinforcing fibers present in the composition in an amount of at least 10% by weight up to 50% by weight; and
polytetrafluoroethylene in an amount from 0.1% to 50% by weight.

* * * * *